(12) United States Patent
Bennett

(10) Patent No.: US 8,575,468 B2
(45) Date of Patent: Nov. 5, 2013

(54) SOLAR AMTEC POWER SYSTEM

(75) Inventor: Mark D. Bennett, Benld, IL (US)

(73) Assignee: The Boeing Company, Chicago, IL (US)

(*) Notice: Subject to any disclaimer, the term of this patent is extended or adjusted under 35 U.S.C. 154(b) by 1052 days.

(21) Appl. No.: 12/547,901

(22) Filed: Aug. 26, 2009

(65) Prior Publication Data
US 2011/0048487 A1 Mar. 3, 2011

(51) Int. Cl.
*H01L 35/00* (2006.01)
*H01L 35/12* (2006.01)

(52) U.S. Cl.
USPC .................................. 136/206; 136/236.1

(58) Field of Classification Search
USPC ................................ 136/218, 234, 236.1
See application file for complete search history.

(56) References Cited

U.S. PATENT DOCUMENTS

| | | | |
|---|---|---|---|
| 4,055,948 A | 11/1977 | Kraus et al. | |
| 4,148,300 A | 4/1979 | Kaufman, Sr. | |
| 4,188,941 A | 2/1980 | Hopkins | |
| 4,292,579 A | 9/1981 | Constant | |
| 4,459,970 A | 7/1984 | Clee | |
| 4,510,210 A | 4/1985 | Hunt | |
| 4,545,366 A * | 10/1985 | O'Neill | 126/698 |
| 4,835,071 A | 5/1989 | Williams et al. | |
| 4,857,421 A | 8/1989 | Ernst | |
| 5,085,948 A | 2/1992 | Tsukamoto et al. | |
| 5,143,051 A | 9/1992 | Bennett | |
| 5,317,145 A * | 5/1994 | Corio | 250/203.4 |
| 5,441,575 A | 8/1995 | Underwood et al. | |
| 5,518,554 A * | 5/1996 | Newman | 136/248 |
| 5,942,719 A * | 8/1999 | Sievers et al. | 136/205 |
| 6,313,391 B1 | 11/2001 | Abbott | |
| 6,656,238 B1 | 12/2003 | Rogers et al. | |

(Continued)

FOREIGN PATENT DOCUMENTS

| | | |
|---|---|---|
| DE | 4028403 | 3/1992 |
| DE | 4028404 | 3/1992 |
| DE | 4028406 | 3/1992 |
| DE | 10033157 | 1/2002 |

OTHER PUBLICATIONS

B. Zalba, J.M. Marin L.F. Cabeza, H. Mehling, "Review on thermal energy storage wiuth phase change: materials, heat transfer analysis, and application", Applied Thermal Engineering, 23, 2003, 251-283.*

(Continued)

*Primary Examiner* — Jennifer Michener
*Assistant Examiner* — Marla D McConnell
(74) *Attorney, Agent, or Firm* — Diane Tsuda

(57) ABSTRACT

A solar AMTEC power system including a support structure, an electric generator segment connected to the support structure, the electric generator segment including a receiver and at least two wings extending at a non-zero angle relative to the receiver, wherein each wing defines an enclosed volume divided into a hot chamber and a cold chamber and includes at least one AMTEC cell extending between the hot chamber and the cold chamber, and wherein the receiver is at least partially transparent to solar energy and defines a heated chamber and a fluid return chamber, the fluid return chamber being in fluid communication with the heated chamber and the cold chambers of the wings, and the heated chamber being in fluid communication with the hot chambers of the wings, and an optical element positioned relative to the electric generator segment to direct solar energy to the receiver.

20 Claims, 5 Drawing Sheets

(56) References Cited

U.S. PATENT DOCUMENTS

| | | | |
|---|---|---|---|
| 7,431,570 B2 | 10/2008 | Young et al. | |
| 2001/0008121 A1 | 7/2001 | Tanabe et al. | |
| 2003/0037814 A1* | 2/2003 | Cohen et al. | 136/246 |
| 2004/0101750 A1 | 5/2004 | Burch | |
| 2005/0223632 A1 | 10/2005 | Matviya et al. | |
| 2006/0086118 A1 | 4/2006 | Venkatasubramanian et al. | |
| 2006/0231133 A1 | 10/2006 | Fork et al. | |
| 2006/0243317 A1 | 11/2006 | Venkatasubramanian | |
| 2008/0000516 A1 | 1/2008 | Shifman | |

OTHER PUBLICATIONS

Product literature, "Product Data Sheet: CFOAM® Carbon Foams," by Touchstone Research Laboratory, Triadelphia, West Virginia (2 pages).

"CFOAM® Product Overview," web page by Touchstone Research Laboratory, Ltd., http://www.cfoam.com/whatis.htm (2 pages).

"CFOAM® Carbon Foam Insulation Applications," web page by Touchstone Research Laboratory, Ltd., http://www.cfoam.com/insulation.htm (1 page).

PCT, International Search Report and Written Opinion, International Application No. PCT/US2010/044140 (Dec. 7, 2010).

Schock, A. et al., "Design, Analyses, and Fabrication Procedure of AMTEC Cell, Test Assembly, and Radioisotope Power System for Outer-Planet Missions," *Acta Astronautica*, vol. 50, No. 8, pp. 471-510 (2002).

Sievers, R.K. et al., "Alkali Metal Thermal to Electric Conversion," *Mechanical Engineering* (11 pages) (1995).

Buschle, J. et al. (2006) Latent Heat Storage Process Heat Applications, ECOSTOCK 2006, Stockton New Jersey, 31.5—Feb. 6, 2006.

Bossman, DE 4028406, Mar. 12, 1992, machine translation (8 pages).

Insaco, Alumina Properties, Mar. 2, 2006, http://www.azom.com/article.aspx?ArticleID=3269.

Touchstone Labs, Carbon foam insulation applications, Jul. 4, 2007, www.cfoam.com/insulation.htm (via wayback machine).

Powell, R.W. et al., "Thermal Conductivity of Selected Materials," National Standard Reference Data System, U.S. Department of Commerce, pp. 1-20 (1966).

US, Office Action, U.S. Appl. No. 12/579,079 (Sep. 14, 2012).

\* cited by examiner

SOLAR AMTEC POWER SYSTEM

FIELD

The present patent application relates to concentrating solar power systems and, more particularly, to solar alkali metal thermal-to-electric converter ("AMTEC") power systems.

BACKGROUND

Concentrating solar power systems employ optical elements, such as mirrors and lenses, to focus a large area of incoming sunlight into a concentrated location. For example, parabolic trough concentrating solar power systems employ elongated parabolic mirrors that focus incoming sunlight on elongated receivers supported over the mirrors. The entire parabolic trough assembly may be supported on a tracker that maintains precise alignment of the mirrors with the sun as the sun moves across the sky.

AMTEC power systems are configured to take advantage of temperature gradients across an AMTEC cell to convert thermal energy directly into electrical energy. A typical AMTEC cell includes a beta-alumina solid electrolyte ("BASE"), which is an electronic insulator and an ionic conductor. In an AMTEC power system, the AMTEC cell defines a barrier between a hot side and a cold side and the opposing sides of the cell are electrically coupled through an external load circuit. When an alkali metal, such as sodium, is heated on the hot side of the cell, the sodium metal gives up electrons which pass through the load circuit while corresponding sodium ions pass through the electrolyte to the cold side of the system, thereby driving an electric current. At the cold side, sodium ions are neutralized by the electrons returning from the load circuit to yield condensed sodium metal, which may then be recycled to the hot side of the system.

Solar AMTEC power systems utilize concentrating solar power optical systems to generate the required temperature gradient across the AMTEC cell that drives the electric current. However, existing solar AMTEC power systems employ complex mechanisms, such as pumps and wicks, for regenerating the condensed alkali metal. Such regeneration mechanisms increase the overall cost of such systems and, if they contain moving parts, substantially increase the likelihood of failure.

Accordingly, those skilled in the art continue to seek advances in the field of solar AMTEC power systems.

SUMMARY

In one aspect, the disclosed solar AMTEC power system may include a support structure, an electric generator segment connected to the support structure, the electric generator segment including a receiver and at least two wings extending at a non-zero angle relative to the receiver, wherein each wing defines an enclosed volume divided into a hot chamber and a cold chamber and includes at least one AMTEC cell extending between the hot chamber and the cold chamber, and wherein the receiver is at least partially transparent to solar energy and defines a heated chamber and a fluid return chamber, the fluid return chamber being in fluid communication with the heated chamber and the cold chambers of the wings, and the heated chamber being in fluid communication with the hot chambers of the wings, and an optical element positioned relative to the electric generator segment to direct solar energy to the receiver.

In another aspect, the disclosed solar AMTEC power system may include a support structure, a plurality of electric generator segments connected to the support structure, each segment of the plurality of electric generator segments including a receiver, a first wing extending at a first non-zero angle relative to the receiver and a second wing extending at a second non-zero angle relative to the receiver, the first non-zero angle being generally equal to and symmetrical with the second non-zero angle relative to a vertical axis of the receiver, wherein each wing includes a housing that defines an enclosed volume divided by a thermal barrier wall into a hot chamber and a cold chamber and includes a plurality of AMTEC cells extending through the thermal barrier wall between the hot chamber and the cold chamber, and wherein the receiver includes a transparent cover and a housing that defines a heated chamber, a fluid return chamber and an inlet to the heated chamber, wherein at least a portion of the fluid return chamber is thermally insulated from the heated chamber, and wherein the transparent cover is sealingly connected to the inlet, and wherein the fluid return chamber is in fluid communication with the heated chamber and the cold chambers of the wings, and the heated chamber is in fluid communication with the hot chambers of the wings, and a linear Fresnel lens positioned relative to the plurality of electric generator segments to direct solar energy to the receivers.

Other aspects of the disclosed solar AMTEC power system will become apparent from the following description, the accompanying drawings and the appended claims.

DETAILED DESCRIPTION

Figure 1:
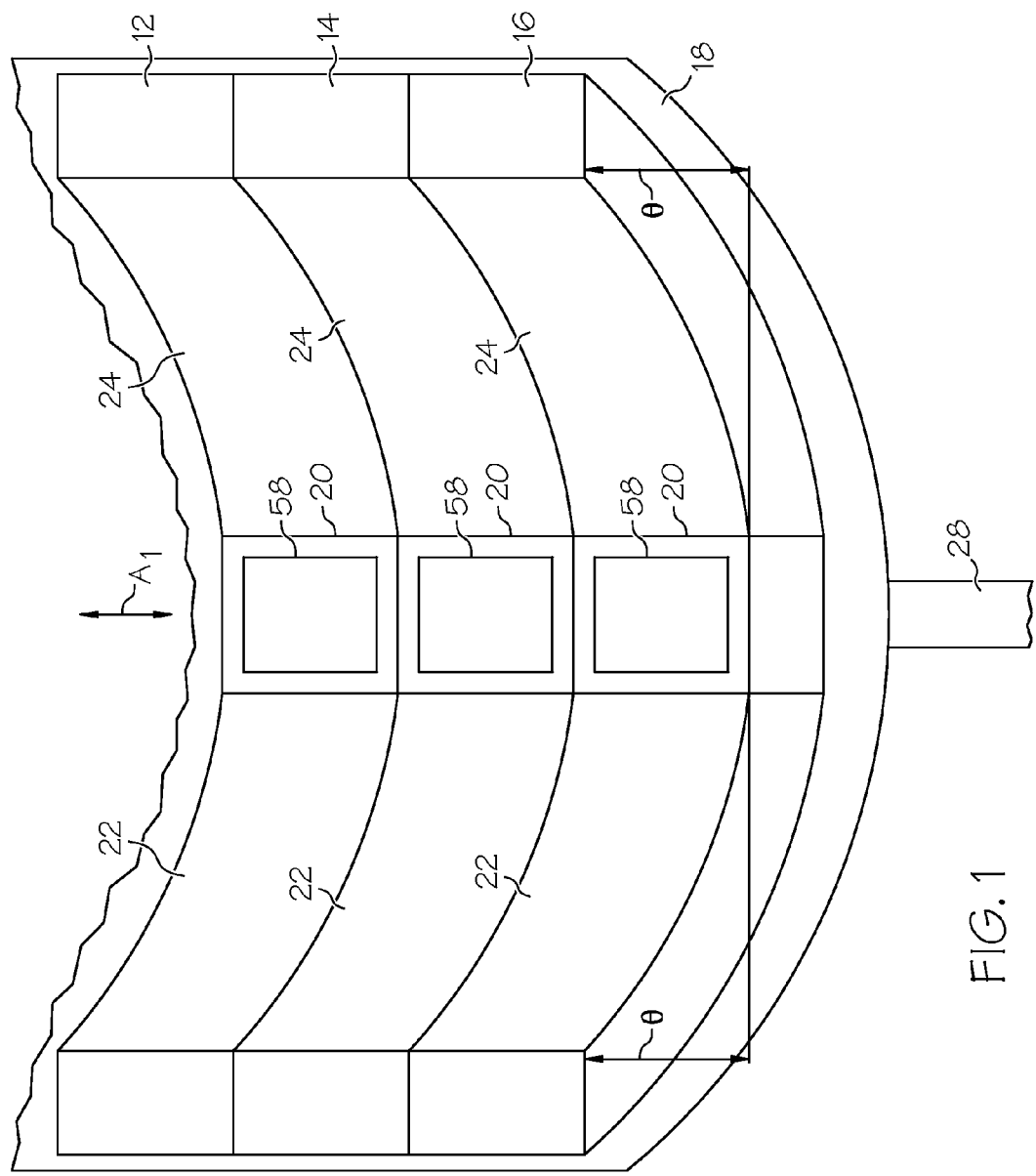
FIG. 1 is a front perspective view of a portion of a solar AMTEC power system in accordance with one aspect of the present disclosure, wherein the system is shown with the associated optical element removed.
Figure 3:
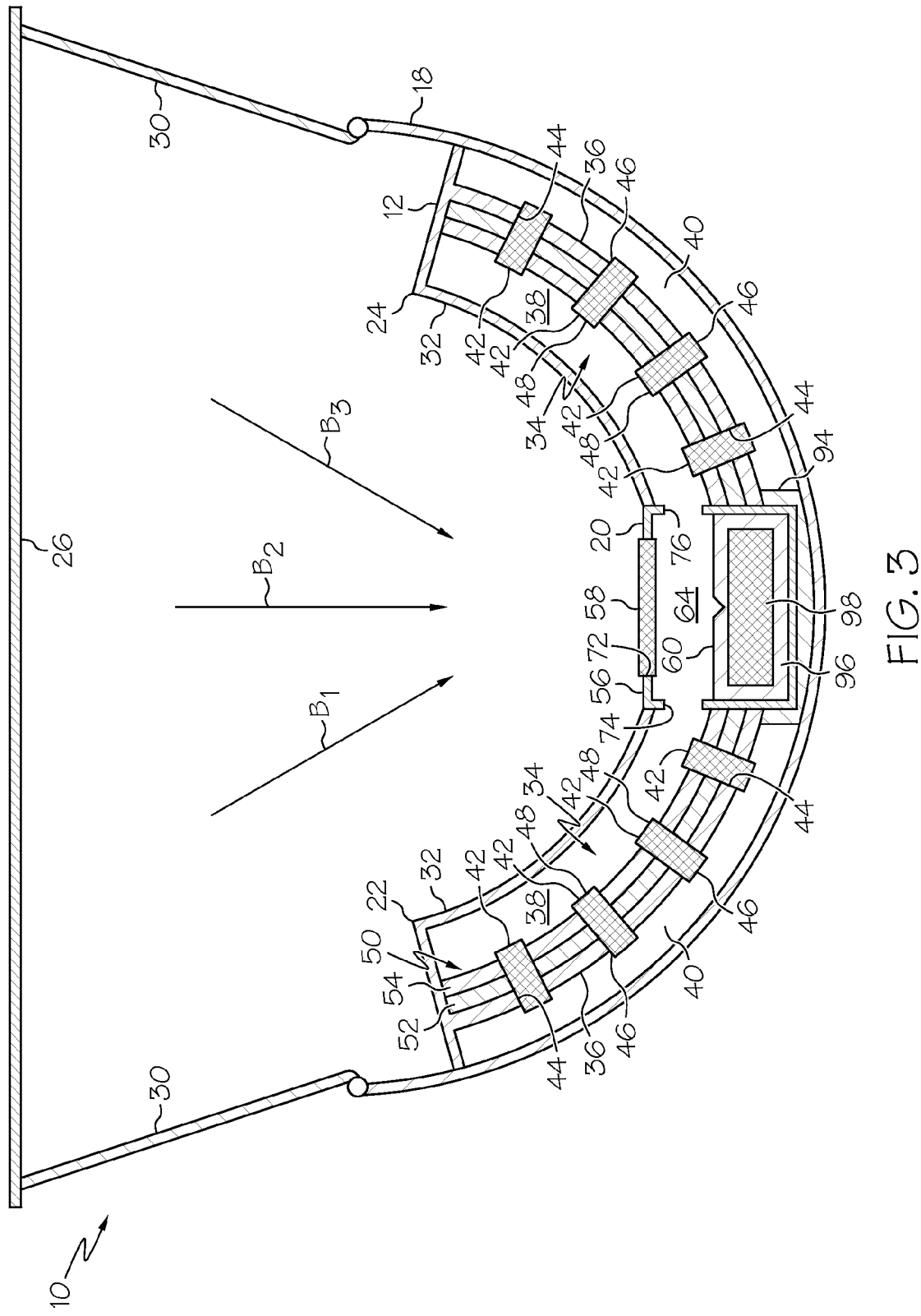
FIG. 3 is a top plan view, in section, of the solar AMTEC power system of FIG. 1, shown with the associated optical element.

As shown in FIG. 1, one aspect of the disclosed solar AMTEC power system, generally designated 10, may include a plurality of electric generator segments 12, 14, 16 mounted in axial alignment on a support structure 18. Each generator segment 12, 14, 16 may include a receiver 20 and at least two wings 22, 24 extending outward from the receiver 20. As shown in FIG. 3, an optical element 26 may be positioned to direct incoming sunlight to the receivers 20 of the generator segments 12, 14, 16, as shown by arrows $B_1$, $B_2$ and $B_3$.

In one particular aspect, the optical element 26 may be a linear Fresnel lens supported relative to the support structure 18 by a hinged bracket 30. The linear Fresnel lens may focus incoming light into a line that extends along the receivers 20 of the system 10. However, those skilled in the art will appreciate that various optical elements or combinations of optical elements may be used to concentrate solar energy onto the receivers 20 without departing from the scope of the present disclosure.

Referring to FIG. 1, the support structure 18 may be mounted on a mast 28 having an longitudinal axis $A_1$, and the mast 28 may be secured to the ground or other appropriate sub-structure, as is known in the art. While not shown, those skilled in the art will appreciate that a dual-axis tracking system may be used to facilitate both rotation of the support structure 18 about the axis $A_1$, as well as pitching of the support structure 18 at an angle relative to the longitudinal axis $A_1$, such that the solar AMTEC power system 10 may be maintained in alignment with the sun. In one particular aspect, the support structure 18 may be mounted such that the receivers 20 are always pitched at an angle (e.g., 15 degrees) relative to the longitudinal axis $A_1$, thereby encouraging fluid to pool at the rear of the receivers 20 proximate the cool side (discussed below) of the system 10.

In one aspect, as shown in FIG. 1, the support structure 18 may be shaped as an elongated parabolic trough and the receivers 20 may be arranged substantially linearly proximate (i.e., at or about) the apex of the parabolic trough. For example, two support structures 18 may be constructed in accordance with the present disclosure by halving a cylindrical body, such as a typical 55-gallon drum, along the longitudinal axis of the cylindrical body. With reference to FIGS. 1 and 3, those skilled in the art will appreciate that the wings 22, 24 of the generator segments 12, 14, 16 may be shaped to correspond to the shape and contour of the support structure 18. In another aspect (not shown), the support structure 18 may be a generally flat and planar support structure, such as the type typically used to support arrays of photovoltaic cells.

Figure 2:
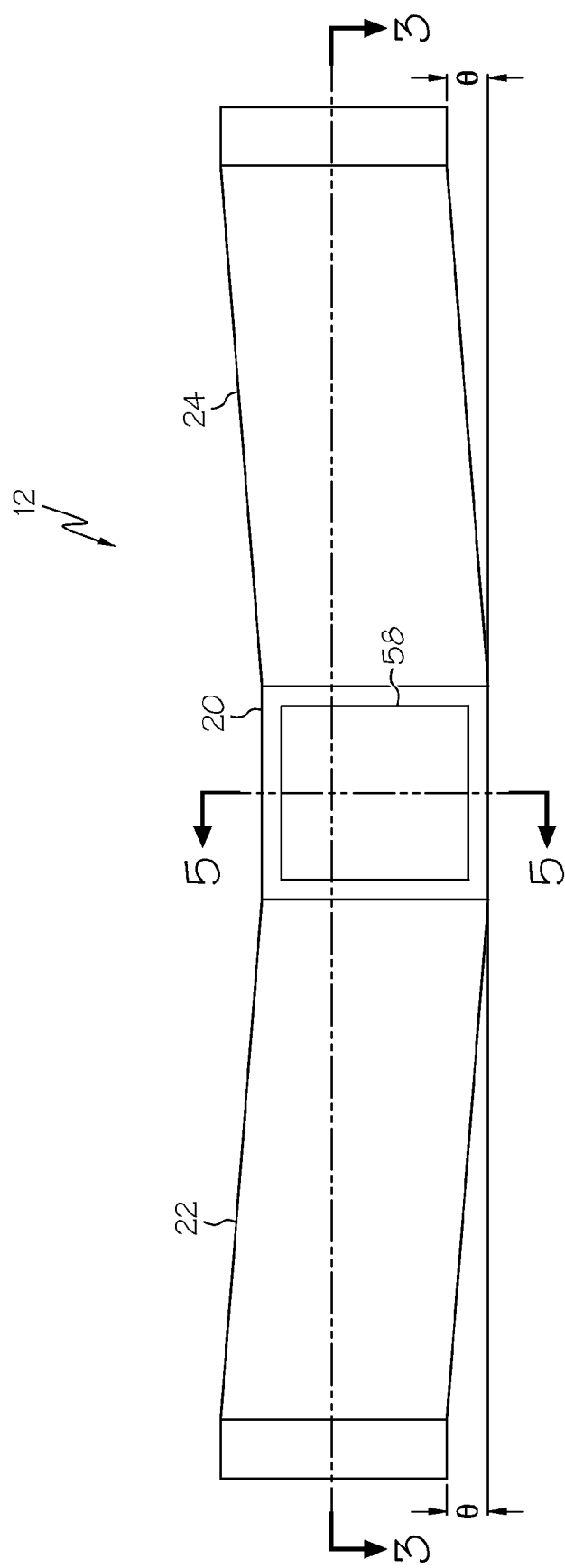
FIG. 2 is a front elevational view of one electric generator segment of the solar AMTEC power system shown in FIG. 1.

Referring to FIGS. 1 and 2, each generator segment 12, 14, 16 may be winged by extending the wings 22, 24 outward from the receiver 20 at an angle θ relative to the receiver 20. For example, the winging angle θ may be about 15 degrees. However, various winging angles θ may be selected based upon design considerations, which may include, for example, the overall orientation (e.g., the pitch) of the system 10 relative to the directional component of the force of gravity.

At this point, those skilled in the art will appreciate that wings 22, 24 that have been disposed at an angle θ relative to the receiver 20 may facilitate gravity flow of condensed fluid from the wings 22, 24 to the fluid return chamber 66 (FIG. 5) (discussed below) of the receiver 20 when the system 10 is mounted upright as shown in FIG. 1, thereby eliminating the need for pumps, wicks and the like for returning fluid to the receiver 20.

Referring now to FIG. 3, each wing 22, 24 may include a housing 32 that defines an enclosed volume 34 and couples the wing 22, 24 to the associated receiver 20. Optionally, as shown in FIG. 3, the enclosed volume 34 may be partially defined by the support structure 18 as well as the housing 32. A thermal barrier wall 36 may extend through the enclosed volume 34 to define a hot chamber 38 and a cold chamber 40 therein.

The thermal barrier wall 36 may include a plurality of holes 44 formed therein, wherein the holes 44 may be sized and shaped to receive and support a plurality of AMTEC cells 42 therein. For example, each wing 22, 24 may include 24 AMTEC cells 42 for a total of 48 AMTEC cells 42 per generator segment 12, 14, 16. The AMTEC cells 42 may extend through the holes 44 in the thermal barrier wall 36 such that a first, cold portion 46 of each AMTEC cell 42 extends into the cold chamber 40 and a second, hot portion 48 of each AMTEC cell 42 extends into the hot chamber 38. A thermal adhesive (not shown), such as a thermal adhesive available from Dow Corning Corporation of Midland, Mich., may be used to secure the AMTEC cells 42 in the holes 44 and to the thermal barrier wall 36.

Thus, the radial length of each wing 22, 24 (i.e., the length that the wing 22, 24 extends outward from the receiver 20) may depend on the overall size of the system 10, including the size of the optical element 26, the receiver 20 and/or the number of AMTEC cells 42 being supported in each wing 22, 24.

The AMTEC cells 42 may be any AMTEC cells known in the art, and may include an anode (not shown), a cathode (not shown) and an electrolyte (not shown). For example, the electrolyte may be a ceramic electrolyte, such as a beta-alumina solid electrolyte, and the anode and cathode may be formed from a metal, such as tungsten steel. In one particular aspect, the AMTEC cells 42 may be hollow-rod type AMTEC cells and may be electrically coupled to each other in series and, ultimately, to an external load circuit.

The housing 32, the thermal barrier wall 36 and the outer housing 56 of the receiver 20 (discussed below) may be formed from a generally rigid material, such as aluminum, steel (e.g., stainless steel) or the like. Appropriate non-metal materials may also be used, such as plastic. For example, the housing 32 may be constructed from internally or structurally reinforced plastic. Those skilled in the art will appreciate that the housing 32, the thermal barrier wall 36 and the outer housing 56 may be constructed using well known forming techniques, such as cutting and welding. Furthermore, while the housing 32 that forms the wings 22, 24 is shown as having a generally rectangular cross-section, those skilled in the are will appreciate that the housing 32 may be formed in various shapes and geometries, which may be dictated only by the need for an enclosed volume 34 and the ability to receive and support the AMTEC cells 42 across hot 38 and cold 40 chambers.

In one optional aspect, a thermal block 50 may be disposed between the thermal barrier wall 36 and the hot chamber 38. The AMTEC cells 42 may extend through the thermal block 50 as well as the thermal barrier wall 36. The thermal block 50 may be formed as a layered structure that may include at least a first layer 52 of thermally insulative material and a second layer 54 of thermally conductive material, wherein the first layer 52 may be disposed between the thermal barrier wall 36 and the second layer 54. Therefore, the second layer 54 may facilitate greater heat transfer to the hot side 48 of the AMTEC cells 42, while the first layer 52 may provide insulation between the hot chamber 38 and the cold chamber 40, thereby maintaining a desired temperature gradient across the hot 48 and cold 46 sides of the AMTEC cells 42.

In one exemplary and optional aspect, the thermally insulative material of the first layer 52 may have a thermal conductivity in the range of about 0.25 to about 25 W/m-K and the thermally conductive material of the second layer 54 may have a thermal conductivity of at least about 200 W/m-K. One exemplary thermally insulative material that may be used in the first layer 52 may be CFOAM carbon foam, such as CFOAM-20, available from Touchstone Research Laboratory, Ltd of Triadelphia, W. Va. One exemplary thermally conductive material that may used in the second layer 54 may be PTM 3180, which is available from Honeywell of Morris Township, N.J. Another exemplary thermally conductive material that may used in the second layer 54 may be POCO HTC, which is available from Poco Graphite, Inc. of Decatur, Tex.

At this point, those skilled in the art will appreciate that thermal isolation between the hot chamber 38 and the cold chamber 40 may increase the temperature gradient across the hot and cold chambers 38, 40, thereby increasing the efficiency of the Seebeck effect that drives the system 10. Therefore, the cross-sectional thicknesses of the layers 52, 54 of the thermal block 50 may depend on, among other things, the type of thermally insulative and thermally conductive materials used, the overall size of the system 10 and the magnitude of the temperature gradient desired.

Figure 4:
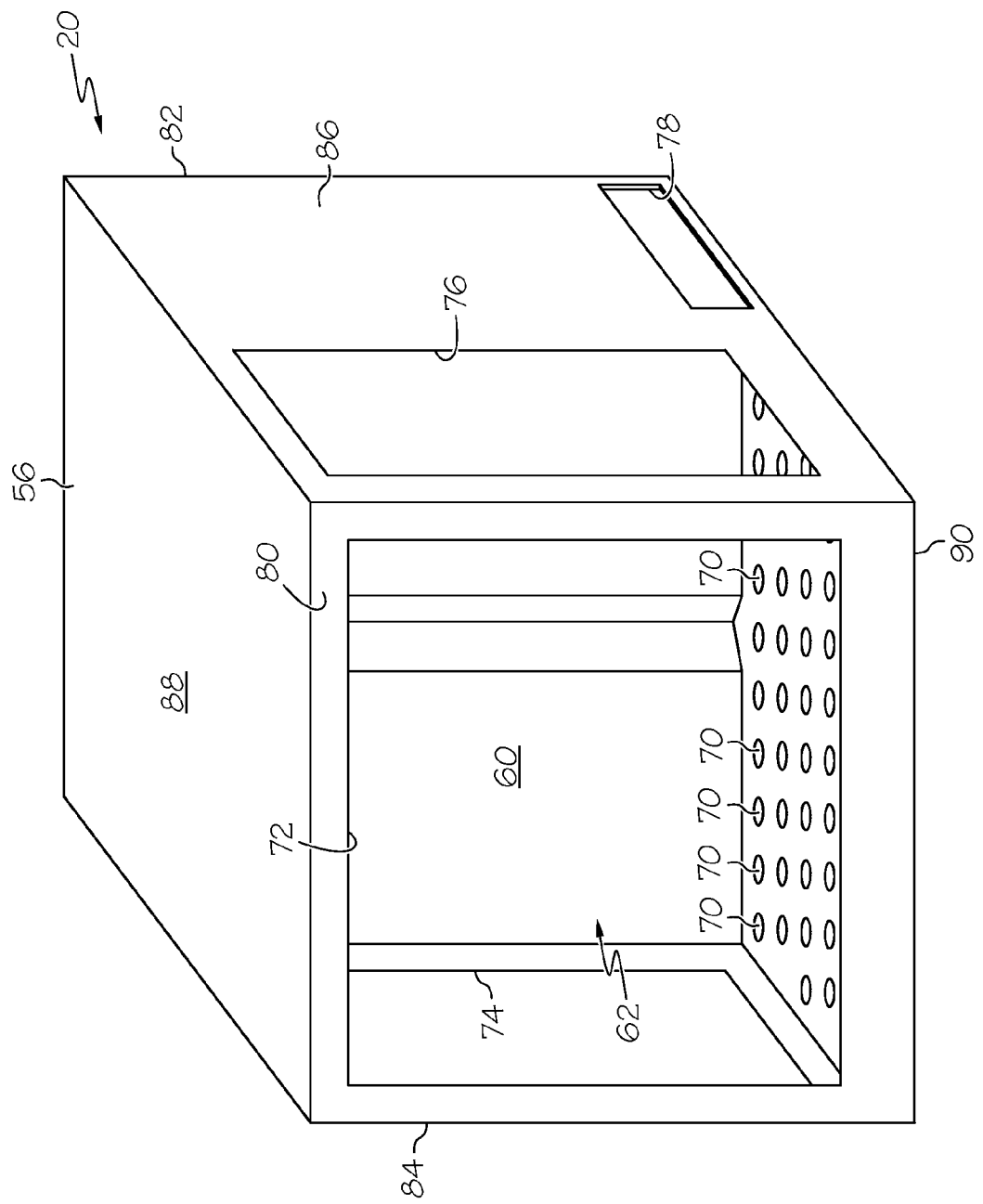
FIG. 4 is a front perspective view of the receiver of the electric generator segment shown in FIG. 2, wherein the receiver is shown with the transparent cover removed.
Figure 5:
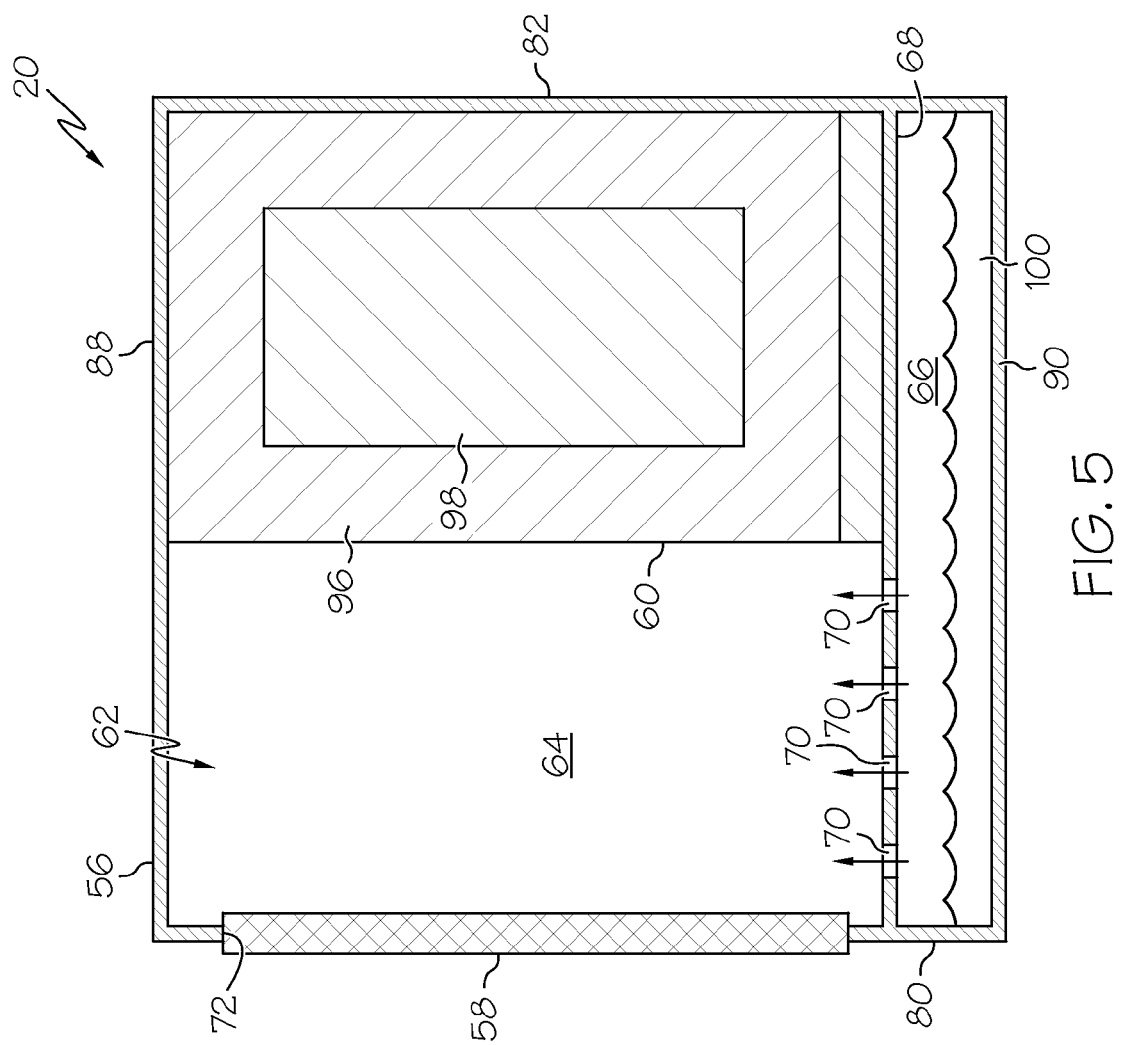
FIG. 5 is a side elevational view, in section, of the receiver shown in FIG. 4, wherein the receiver is shown with the transparent cover in place.

Referring now to FIGS. 3-5, each receiver 20 may include an outer housing 56, a transparent cover 58 (FIGS. 3 and 5) and, optionally, a thermal energy storage material 60. The outer housing 56 may define an internal volume 62 which may include a heated chamber 64 and a fluid return chamber 66 separated by a dividing wall 68. Outlet ports 70 may be formed in the dividing wall 68 to provide fluid communication between the fluid return chamber 66 and the heated chamber 64. A layer of insulation 92 may thermally insulate at least a portion of the heated chamber 64 (e.g., the portion adjacent the thermal energy storage material 60) from the fluid return chamber 66. Indeed, as shown in FIG. 3, an additional layer of insulation 94 may thermally insulate the receiver 20 from the cold chamber 40 of the wings 22, 24, as well as from the support structure 18.

A solar energy inlet 72 defined by the outer housing may provide access to the heated chamber 64. The transparent cover 58 may be sealingly disposed in or over the inlet 72 to enclose the heated chamber 64. The transparent cover 58 may be formed from any material that is at least partially transparent to solar energy such that incoming solar energy (arrows $B_1$, $B_2$, $B_3$ in FIG. 3) penetrates the receiver 20 and heats the thermal energy storage material 60 disposed in the heated chamber 64 and, ultimately, the alkali metal that drives the system 10. In one particular aspect, the transparent cover 58 may be formed from a material having high light transmittance and low light reflectance. For example, the transparent cover 58 may be constructed from glass, such as low-iron glass, or optically clear (or at least partially clear) ceramic. The wall thickness of the transparent cover 58 may be selected to optimize solar energy collection/retention as well as mechanical strength, which may depend on the environment in which the system 10 will be deployed.

Referring to FIGS. 3 and 4, a first opening 74 may be formed in the outer housing 56 and may provide fluid communication between the heated chamber 64 of the receiver 20 and the hot chamber 38 of the first wing 22 connected to the receiver 20. Similarly, a second opening 76 may be formed in the outer housing 56 and may provide fluid communication between the heated chamber 64 of the receiver 20 and the hot chamber 38 of the second wing 24 connected to the receiver 20. Those skilled in the art will appreciate that the size and shape of the openings 74, 76, as well as the total number of openings between the receiver 20 and each wing 22, 24, may be varied so long as vapor is capable of traveling from the heated chamber 64 of the receiver 20 to the hot chambers 38 of the wings 22, 24.

Referring to FIG. 4, a return port 78 may be formed in the outer housing 56 and may provide fluid communication between the fluid return chamber 66 (FIG. 5) of the receiver 20 and the cold chamber 40 of the second wing 24 connected to the receiver 20. Similarly, a second return port (not shown) may be formed in the outer housing 56 and may provide fluid communication between the fluid return chamber 66 of the receiver 20 and the cold chamber 40 of the first wing 24 connected to the receiver 20. In one particular aspect, the return ports 78 may be in fluid communication with fluid collection channels (not shown) that extend through, or that are in fluid communication with, the cold chamber 38 of the wings 22, 24 and that collect and direct condensed fluid to the return ports 78.

Referring to FIG. 4, in one exemplary aspect, the receiver 20 may be formed as a rectilinear compartment having six sides: a front side 80, a rear side 82, a left side 84, a right side 86, a top side 88 and a bottom side 90. The inlet may be formed in the front side 80, the first opening 74 and the first fluid return port (not shown) may be formed in the left side 84, the second opening 76 and the second fluid return port 78 may be formed in the right side 86 and the fluid return chamber 66 (FIG. 5) may extend along the bottom side 90. However, those skilled in the art will appreciate that various constructions and geometries may be used without departing from the scope of the present disclosure.

In one aspect, as shown in FIGS. 3 and 5, the thermal energy storage material 60 may be a salt-based system wherein a core 96 of salt may be surrounded by a layer 94 of thermally conductive material. For example, the thermally conductive material may be solid graphite and the salt may be potassium nitrate, sodium nitrate, sodium nitrite or combinations thereof. Therefore, as is known in the art, additional heat may be stored by the thermal energy storage material 60 by melting the salt.

Accordingly, the optical element 26 may focus incoming solar energy onto the thermal energy storage material 60, as shown by arrows $B_1$, $B_2$, $B_3$ in FIG. 3, thereby increasing the temperature in the heated chamber 64 of the receiver 20. The increased temperature vaporizes alkali metal 100 (FIG. 5) in the fluid return chamber 66 and the heated alkali metal vapor exits the heated chamber 64 of the receiver 20 and enters the hot chambers 40 of the wings 22, 24 by way of the first and second openings 74, 76 (FIG. 4). The alkali metal vapor interacts with the AMTEC cells 42 in the wings 22, 24 to generate electricity, as is well known in the art, resulting in condensed alkali metal in the cold chambers 40. The condensed alkali metal then flows by gravity from the cold chambers 40 of the wings 22, 24 to the return ports 78 due to the angle θ of the wings 22, 24 relative to the receiver 20, and pools in the fluid return chamber 66. Therefore, the disclosed system 10 provides for gravity-driven regeneration of the alkali metal.

The alkali metal 100 may be sodium metal. However, those skilled in the art will appreciate that other alkali metals, such as lithium, potassium and rubidium, may also be used. Furthermore, those skilled in the art will appreciate that the alkali metal 100 may be substituted with other materials capable of providing the same function in the system 10 without departing from the scope of the present disclosure.

Condensation within the cold chambers 40 of the wings 22, 24 may be facilitated by radiating heat from the portions of the support structure 18 or housing 32 that defines the cold chambers 40. For example, one or more layers of a thermally conductive material, such as PTM 3180 and/or POCO HTC, may be coupled to the support structure 18 or housing 32 adjacent the cold chamber 40.

Although various aspects of the disclosed solar AMTEC power system have been shown and described, modifications may occur to those skilled in the art upon reading the specification. The present application includes such modifications and is limited only by the scope of the claims.

What is claimed is:

1. A solar power system comprising:
   a support structure;
   an electric generator segment connected to said support structure, said electric generator segment having a receiver and at least two wings extending at a non-zero angle relative to said receiver, wherein each wing defines an enclosed volume divided into a hot chamber and a cold chamber and includes at least one alkali metal thermal-to-electric converter ("AMTEC") cell extending between said hot chamber and said cold chamber, and wherein said receiver is at least partially transparent to solar energy and defines a heated chamber and a fluid return chamber, said fluid return chamber being in fluid communication with said heated chamber and said cold chambers of said wings, and said heated chamber being in fluid communication with said hot chambers of said wings;

an optical element positioned relative to said electric generator segment to direct solar energy to said receiver; and each of said at least two wings being oriented to extend at said non-zero angle outward from said receiver toward said optical element such that said hot chamber faces said optical element, and gravity flow of condensed fluid from said wings away from said optical element to said receiver is facilitated.

2. The solar power system of claim 1 further comprising an alkali metal in said fluid return chamber.

3. The solar power system of claim 1 wherein at least a portion of said fluid return chamber is thermally insulated from said heated chamber.

4. The solar power system of claim 1 wherein said support structure includes a parabolic trough, and wherein said receiver is disposed proximate an apex of said parabolic trough and said wings extend outward from said receiver and are shaped to correspond to a contour of said parabolic trough.

5. The solar power system of claim 1 wherein said support structure is connected to a mast having a longitudinal axis, and wherein said support structure is pitched at an angle relative to said longitudinal axis.

6. The solar power system of claim 5 wherein said wings extend symmetrically outward from said receiver relative to said longitudinal axis.

7. The solar power system of claim 1 wherein said non-zero angle is about 15 degrees.

8. The solar power system of claim 1 further comprising a thermal block disposed between said hot chamber and said cold chamber, wherein said thermal block is formed as a layered structure that includes at least one layer of a thermally conductive material and at least one layer of a thermally insulative material.

9. The solar power system of claim 1 wherein said hot chamber is separated from said cold chamber by at least one layer of insulation.

10. The solar power system of claim 1 wherein said receiver includes a housing that defines an inlet to said heated chamber and a light-transparent cover sealingly connected to said inlet.

11. The solar power system of claim 10 wherein said light-transparent cover is formed from low iron glass.

12. The solar power system of claim 10 wherein said housing defines at least two return ports, and wherein said fluid return chamber is in fluid communication with said cold chambers of said wings by way of said return ports.

13. The solar power system of claim 1 wherein a dividing wall is disposed between said heated chamber and said fluid return chamber, and wherein at least one port extending through said dividing wall provides fluid communication between said fluid return chamber and said heated chamber.

14. The solar power system of claim 1 wherein said receiver further includes a thermal energy storage material disposed in said heated chamber.

15. The solar power system of claim 14 wherein said thermal energy storage material includes graphite and a salt, said salt being selected from the group consisting of potassium nitrate, sodium nitrate, sodium nitrite and combinations thereof.

16. The solar power system of claim 1 wherein said receiver is thermally insulated from said cold chamber.

17. The solar power system of claim 1 wherein said optical element includes a linear Fresnel lens.

18. The solar power system of claim 1 comprising a plurality of said electric generator segments connected to said support structure.

19. A solar power system comprising:

a support structure;

a plurality of electric generator segments connected to said support structure, each segment of said plurality of electric generator segments having a receiver, a first wing extending at a first non-zero angle relative to said receiver and a second wing extending at a second non-zero angle relative to said receiver, said first non-zero angle being generally equal to and symmetrical with said second non-zero angle relative to a vertical axis of said receiver, wherein each wing includes a housing that defines an enclosed volume divided by a thermal barrier wall into a hot chamber and a cold chamber and includes a plurality of AMTEC cells extending through said thermal barrier wall between said hot chamber and said cold chamber, and wherein said receiver includes a transparent cover and a housing that defines a heated chamber, a fluid return chamber and an inlet to said heated chamber, wherein at least a portion of said fluid return chamber is thermally insulated from said heated chamber, and wherein said transparent cover is sealingly connected to said inlet, and wherein said fluid return chamber is in fluid communication with said heated chamber and said cold chambers of said wings, and said heated chamber is in fluid communication with said hot chambers of said wings;

a linear Fresnel lens positioned relative to said plurality of electric generator segments to direct solar energy to said receivers; and said at least two wings being oriented to extend at said first non-zero and said second non-zero angle outwardly from said receiver toward said linear Fresnel lens such that said hot chamber faces said linear Fresnel lens, and gravity flow of condensed fluid from said first wing and said second wing away from said Fresnel lens to said receiver is facilitated.

20. The solar power system of claim 19 further comprising an alkali metal in said fluid return chamber.

* * * * *